| NAME | PART | DIMENSION | EXP. COEF. |
|---|---|---|---|
| BEARING SPRING | 37 | a | $\alpha$ |
| FRONT PLATE | 12 | b | $\beta$ |
| SHAFT (FRONT) | 32 | c | $\gamma$ |
| CRITICAL DIMENSION | | d | ZERO |
| MTG. DISC SPACER | 50 | e | $\epsilon$ |
| BASE PLATE | 16 | m | $\mu$ |
| CRITICAL DIMENSION | | g | ZERO |
| MTG. DISCS | 30 | h | $\epsilon$ |
| BACK PLATE | 14 | k | $\beta$ |
| CRITICAL DIMENSION | | l | ZERO |

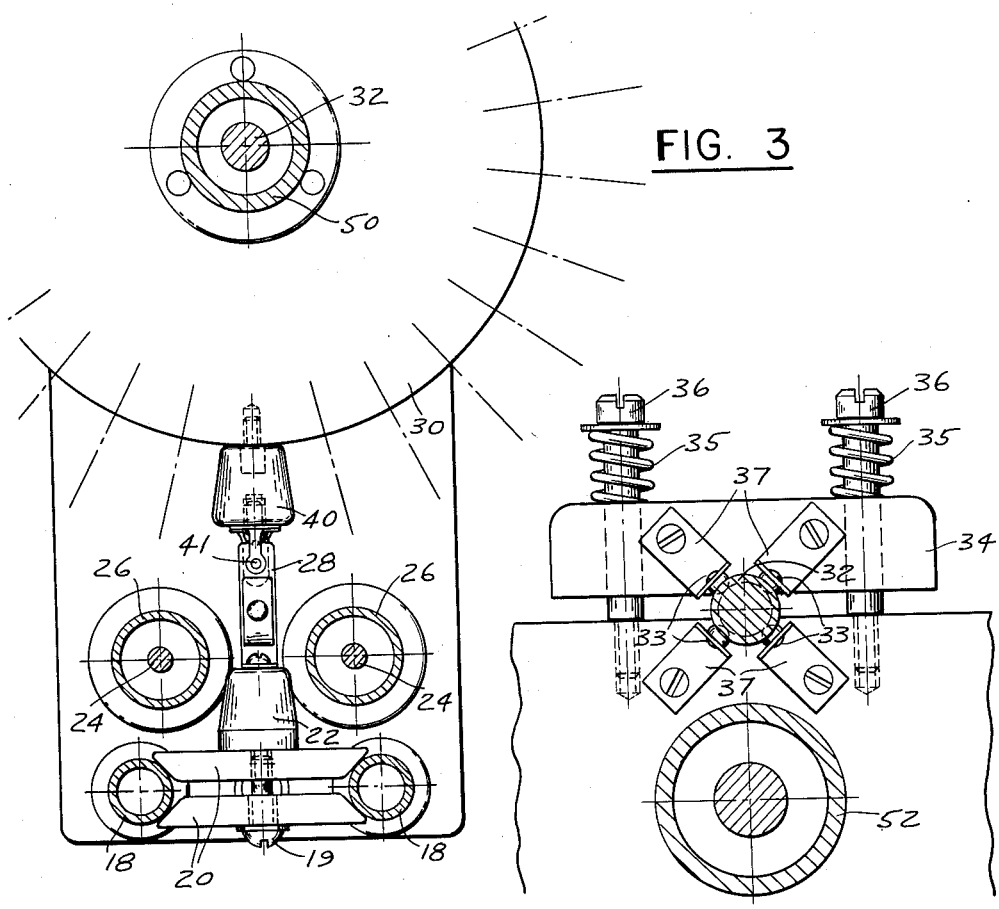
FIG. 3
FIG. 4
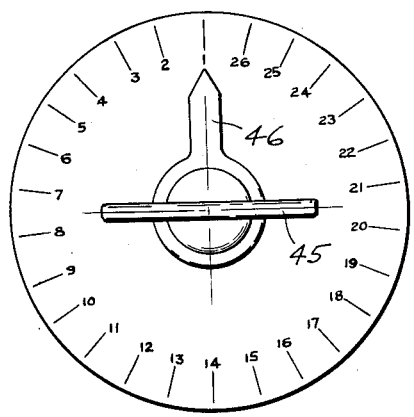
FIG. 5
INVENTORS
LEONARD W. HUBAND
MANFRED HAFNER
BY Hane + Nydick
ATTORNEYS

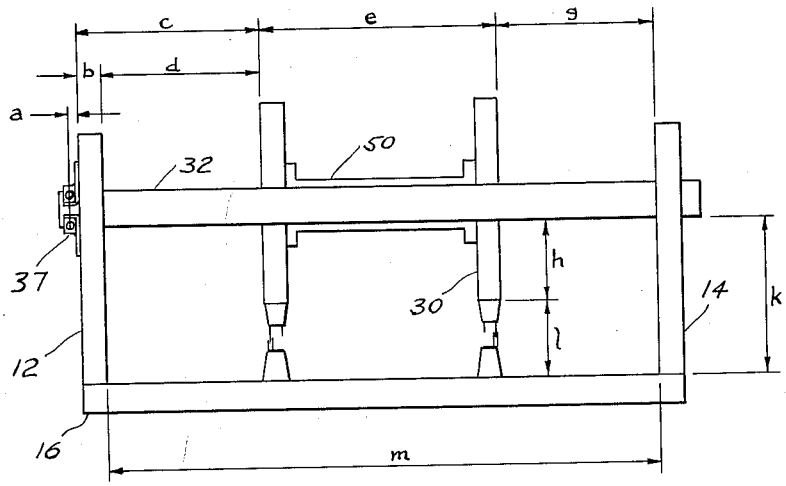

IT IS POSSIBLE TO HOLD THE CRITICAL DIMENSIONS d, g & l CONSTANT BY USING THE FOLLOWING FORMULAE.

1. $c \cdot \gamma = a \cdot \alpha + b \cdot \beta$ ⟶ d = CONSTANT
2. $e \cdot \epsilon = m \cdot \mu$ ⟶ g = CONSTANT
3. $h \cdot \epsilon = k \cdot \beta$ ⟶ l = CONSTANT

FIG. 6

INVENTORS
LEONARD W. HUBAND
MANFRED HAFNER
BY
*Hane & Nydick*
ATTORNEYS

United States Patent Office 3,039,058
Patented June 12, 1962

1

3,039,058
FIXTURE FOR MOUNTING COMPONENTS TO MEASURE THEIR TEMPERATURE COEFFICIENTS
Leonard W. Huband, Spring Lake Heights, and Manfred Hafner, West New York, N.J., assignors to United States Testing Company, Inc., Hoboken, N.J., a corporation of New York
Filed May 26, 1959, Ser. No. 815,949
10 Claims. (Cl. 324—158)

This invention relates to fixtures and, more particularly, to a fixture for supporting components for various types of measurements.

The electrical values of many components used in electronic and electrical equipment change appreciably with changes in temperatures. While these changes are not usually important, there are some instances, such as in frequency determining circuits, sweep circuits, and the like, where temperature variations do affect the accuracy, efficiency, and operation of the equipment. This is particularly true when such equipment is required to operate over wide temperature limits.

It is therefore one of the primary objects of the present invention to proide a fixture which is mechanically and electrically stable over wide temperature ranges, so as to minimize variations which would otherwise adversely affect the results of presently available measuring equipment.

Another object of the present invention is to provide a substantially self-contained fixture for supporting a plurality of substantially identical elements to be tested for sequential movement into a test position, without variations in the mechanical and electrical characteristics during the conduct of the entire test.

Still another object of the present invention is to provide a test specimen holder that will support a large number of samples to be tested and which is mechanically and electrically stable over a wide range of temperatures so that changes in the stray capacitances of the sample holder will be small relative to the capacitance changes of the capacitors being tested.

Still an additional object of the present invention is to provide a test fixture of the type described constructed from predetermined parts of particular composition, all relatively dimensioned and proportioned to expand according to certain principles, so as to enable certain dimensions to be held constant during changes in ambient temperature conditions.

All of the foregoing and still further objects and advantages of this invention will become apparent from a study of the following specification, taken in connection with the accompanying drawing, wherein:

FIGURE 3 is a fragmentary cross sectional view taken along line 3—3 of FIGURE 2;

FIGURE 4 is a fragmentary cross sectional view taken along line 4—4 of FIGURE 2;

FIGURE 5 is an elevational view taken along line 5—5 of FIGURE 2;

FIGURE 6 is a schematic diagram of the apparatus, including a table illustrating certain relationhsips between the parts.

Figure 1:
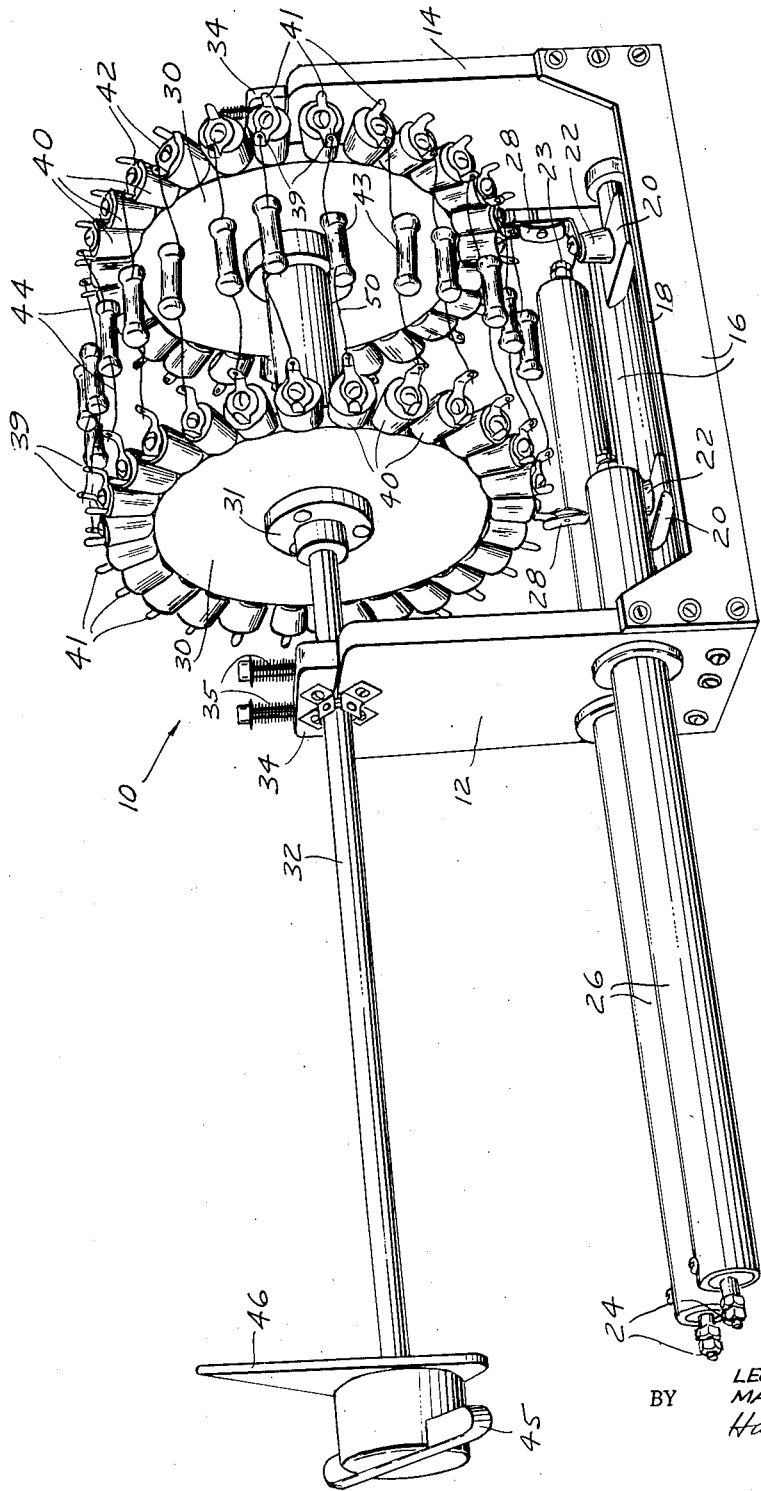
FIGURE 1 is a perspective view of a fixture for mounting components made in accordance with the present invention, in actual use.
Figure 2:
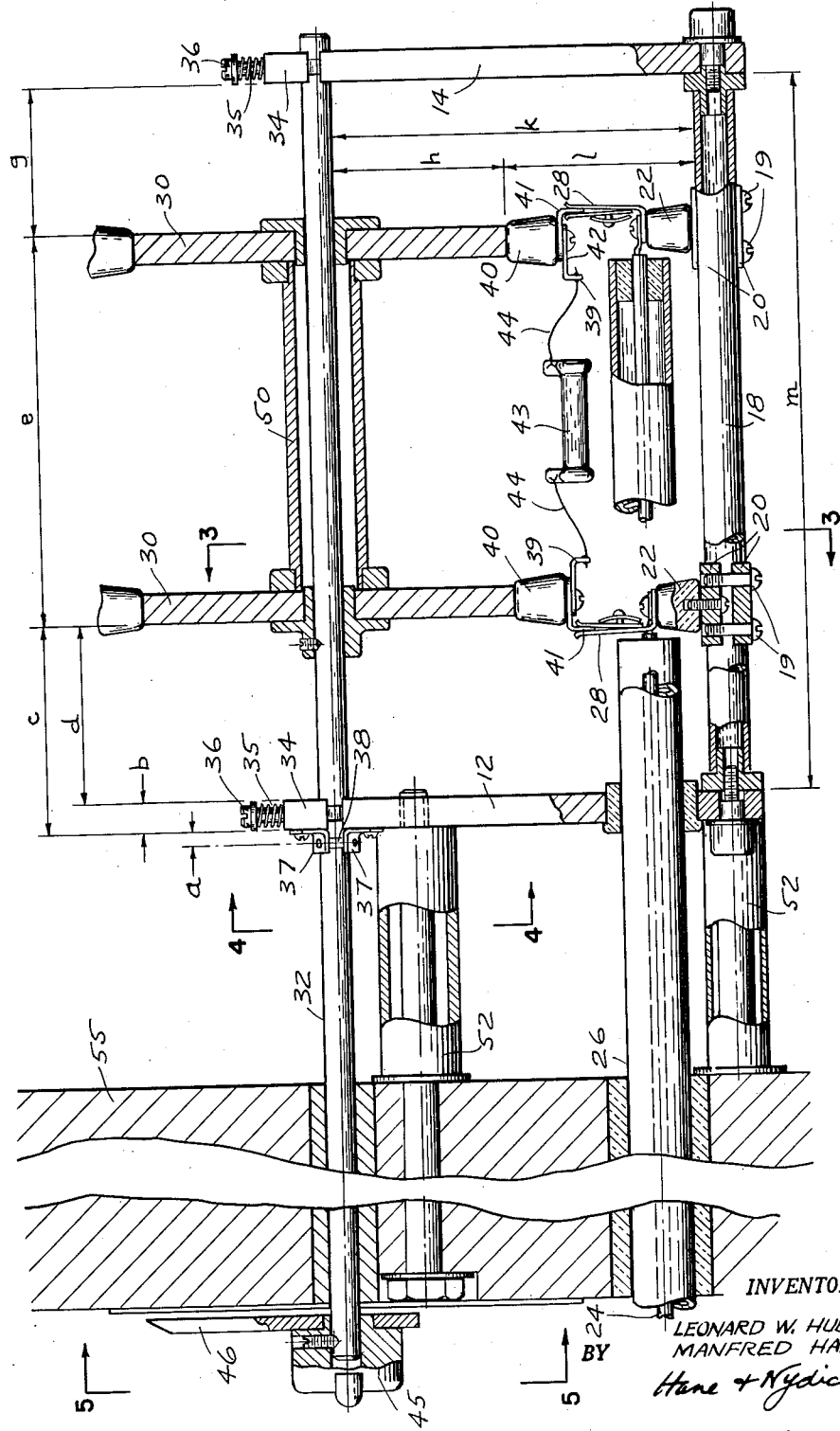
FIGURE 2 is a longitudinal cross sectional view of FIGURE 1.

Referring now to the drawing, a fixture 10 made in accordance with the present invention is shown to include a front plate 12, a back plate 14, and a pair of spaced apart side plates 16 that extend between and cooperate with spacer rods 18 to secure the front and back plates 12, 14 in spaced apart parallel relationship. A pair of sets of longitudinally spaced apart mounting plates 20 are secured by bolts 19 to the spacer rods 18 in spaced apart parallel relationship and each is provided with an insulated base 22. Clip type contacts 28 are mounted, one upon each such insulated base 22 and electrically connected to shielded conductor rods 24 which are preferably of material having a low coefficient of thermal expansion, as for example, of Invar, by means of electrical conductors 23. The rods 24 to which the clip contacts 28 are electrically connected, are coaxially mounted within sleeves 26 and are connected by means of the terminals at the outermost ends thereof to a guard circuit, that can be used for measurement purposes. Since Invar has a very low temperature coefficient of expansion, any minor variations in capacitance can be compensated for in the fixture to maintain a zero temperature coefficient of capacitance at the external terminals of the chamber.

A pair of parallel discs 30 are secured by means of collars 31 concentrically upon a shaft 32 that is rotatably carried by ball bearing elements 33 that are mounted within spring contacts 37, a pair of which is carried upon the top of each of the front and back plates 12, 14. A pair of guide bolts 36 carried upon the top of each of the front and back plates 12, 14 slidably support overlying bearing plates 34, each of which is provided with a pair of spring contacts 37 and associated ball bearings 33. All of the ball bearings 33 carried by the contacts 37 of the front plate 12 are partially received within an annular groove 38 in the shaft 32, thus preventing longitudinal displacement of the shaft 32 while providing a minimum amount of surface friction which will prevent the shaft from freezing at extreme temperatures, thus maintaining constant rotatability of the shaft at all times. Compression springs 35 encircling each of the guide bolts 36 exert a constant pressure, upon the ball bearings 33 carried by the spring contacts 37 through the bearing plate 34, thus providing an initial loading that may be readily overcome by rotation of the shaft 32 to alter the position of the discs 30 relative to the clip contacts 28.

The periphery of each of the discs 30 supports a set of electrical insulators 40 upon each of which is mounted a substantially U-shaped terminal 42. The leads 44 of the capacitors 43 being tested are connected to the inner legs 39 of each pair of clips 42, while the outermost legs thereof extend radially outwardly of generally uniform relationship.

The clip contacts 28 supported upon the base project into the path of rotation of the outer legs 41 of the U-shaped clip 42, thus sequentially receiving each one thereof and providing an electrical circuit through the conductor rods 24 mounted within the carriers 26. A handle 45 secured to the outermost end of the shaft 32 provides means for sequentially rotating the discs 30 that form the mounting for the capacitors 43, so as to selectively connect each one of the capacitors in circuit with the clip contacts 28 of the rods 24. An indicating pointer 46, also secured to the shaft 32 adjacent to the handle 45 provides visual observation means for determining the particular capacitor connected in the test position, thus providing adequate control over the testing of each one of the capacitors carried upon the mounting assembly, from the exterior of a confined area or insulated enclosure.

The accuracy of the fixture is dependent upon maintaining certain critical dimensions constant at all times, even during changes in ambient temperature conditions. Such dimensions are held constant by dimensioning the various parts according to the particular coefficient of expansion of the material from which each part is constructed. The distance between the facing surfaces of the front plate 12 and the front one of the mounting discs 30 is one critical dimension that is maintained constant by having the product of the length of the shaft 32 between the front face of the front disc 30 and the front face of the front plate 12 and the coefficient of expansion of the material from which the shaft is constructed equal the product of the length of the spring bearing 34 and its coefficient of expansion plus the product of the thickness of the front plate 12 and the coefficient of expansion thereof, equal a constant.

The distance between the facing sides of the front face of the rear plate 14 and the rear face of the rearmost mounting disc 30 is another critical dimension that remains constant when the length of a spacer element 50 extending between the mounting discs 30 and its coefficient of expansion equals the product of the length of the base plate between facing sides of the front plate 12 and rear plate 14 multiplied by its coefficient of expansion. Thus, with these critical dimensions held constant, each capacitor is assured of substantially the same test conditions at all times, regardless of changes in ambient temperature over a relatively wide range. These particular relationships are tabulated in FIGURE 6.

The operation of the apparatus will now be more readily understood. The capacitors to be tested are conveniently mounted upon the mounting discs 30, the leads of each capacitor being electrically connected to the innermost legs 39 of each U-shaped clip 42. As the shaft 32 is rotated by the handle 45, as indicated by the pointer 46, the radially outwardly extending outer legs 41 of each of the U-shaped clips 42 will sequentially be electrically received within the clip contacts 28 mounted upon the base, thus completing the electrical circuit of the conductor rods 24 and the associated guard circuit. In actual use, the fixture is mounted upon spacer brackets 52 within an insulated enclosure 55, through which the shaft 32 and conductors 24 extend.

While this invention has been described with particular reference to the construction shown in the drawing, it is to be understood that such is not to be construed as imparting limitations upon the invention, which is best defined by the claims appended hereto.

We claim:

1. A fixture for testing electrical components comprising, in combination, a base, a shaft rotatably supported upon said base, mounting means carried upon said shaft for supporting a plurality of individual articles, terminal means carried by said base in the path of rotation of said mounting means, conductor means connected to said terminal means, and contact means sequentially connecting each article carried by said mounting means to said terminal means, said base comprising a front plate, a back plate, and a pair of connecting sides maintaining said front and back plates in spaced apart parallel relationship, said shaft being rotatably supported upon said front and back plates, and said mounting means comprising a pair of circular discs secured in spaced apart parallel relationship concentrically upon said shaft intermediate said front and back plates, the elements of said combination being dimensioned and proportioned in correlation with their respective coefficients of expansion thereby to provide constancy of selected dimensions of the combination during changes in ambient temperature conditions.

2. A fixture for testing electrical components as set forth in claim 1, wherein said contact means comprises a set of circumferentially spaced apart insulated terminal clips carried by each of said discs, one clip of one disc being paired with a corresponding clip of the other disc, and all of said clips projecting radially outwardly from said discs.

3. A fixture for testing electrical components as set forth in claim 2, wherein said terminal means comprises a pair of spring clips carried upon said base in spaced apart parallel relationship and projecting into the path of rotation of said sets of terminal clips in sequential electrical contact therewith.

4. A fixture for testing electrical components comprising, in combination, a base, a shaft rotatably supported upon said base, mounting means carried upon said shaft for supporting a plurality of individual articles, terminal means carried by said base in the path of rotation of said mounting means, conductor means connected to said terminal means, and contact means sequentially connecting each article carried by said mounting means to said terminal means, said base comprising a front plate, a back plate, and a pair of connecting sides maintaining said front and back plates in spaced apart parallel relationship, said shaft being rotatably supported upon said front and back plates, and said mounting means comprising a pair of circular discs secured in spaced apart parallel relationship concentrically upon said shaft intermediate said front and back plates, said contact means comprising a set of circumferentially spaced apart insulated terminal clips carried by each of said discs, one clip of one disc being paired to a corresponding clip of the other disc, all of said clips projecting radially outwardly from said discs, said terminal means comprising a pair of spring clips carried upon said base in spaced apart parallel relationship and projecting into the path of rotation of said sets of terminal clips in sequential electrical contact therewith, said conductor means comprising a pair of longitudinally extending sleeves extending through said front plate, a rod carried within each one of said sleeves each having a terminal at one end, and the opposite end of each said rod being connected to one of said spring clips, the elements of said combination being dimensioned and proportioned in correlation with their respective coefficients of expansion thereby to provide constancy of selected dimensions of the combination during changes in ambient temperature conditions.

5. A fixture for testing electrical components as set forth in claim 4, wherein one of said discs is in spaced apart parallel relationship with said front plate, and the other one of said discs is in spaced apart parallel relationship with said back plate.

6. A fixture for testing electrical components as set forth in claim 5, wherein the product of the length of said shaft between said front plate and said one disc and the coefficient of expansion of the material from which said shaft is constructed being a constant, whereby the distance between said front plate and said one disc remains substantially constant at all times including periods of ambient temperature change.

7. A fixture for testing electrical components as set forth in claim 5, wherein further comprising a spacer intermediate said pair of discs, the product of the length and coefficient of expansion of said spacer being constant, whereby the distance between said back plate and said other one of said discs remains constant at all times including periods of changes in ambient temperature.

8. A fixture for testing electrical components as set forth in claim 5, wherein the product of the radius of said disc and the coefficient of expansion of the material from which said disc is constructed being a constant, whereby the distance between the periphery of said disc and said base remains constant at all times including periods of ambient temperature change.

9. A fixture for testing electrical components comprising in combination a base comprising a front plate and a back plate and a pair of connecting side plates maintaining said front and back plates in spaced apart parallel relationship, a shaft rotatably supported upon said front and back plates, mounting means carried upon said shaft for supporting a plurality of individual articles, terminal means carried by said base in the path of rotation of said mounting means, conductor means connected to said terminal means, and contact means connected sequentially to each article carried by said mounting means to said terminal means, and friction resistant yieldable bearing means continuously rotatably supporting said shaft in all operating temperature ranges, the elements of said combination being dimensioned and proportioned in correlation with their respective coefficients of expansion thereby to provide constancy of selected dimensions of the combination during changes in ambient temperature conditions.

10. A fixture in accordance with claim 9, further comprising a set of yieldably supported balls carried by said front and back plates which rotatably engage said shaft, each of said set of balls contracting and expanding in response to changes in temperatures to continuously accommodate rotation of said shaft.

References Cited in the file of this patent

UNITED STATES PATENTS

| | | |
|---|---|---|
| 1,795,359 | Berthold | Mar. 10, 1931 |
| 1,832,948 | Schmidt | Nov. 24, 1931 |
| 1,840,391 | Gebhard | Jan. 12, 1932 |
| 2,141,145 | Wooder et al. | Dec. 20, 1938 |
| 2,149,122 | McCall | Feb. 28, 1939 |
| 2,325,854 | Hayes | Aug. 3, 1943 |
| 2,430,080 | Reynolds | Nov. 4, 1947 |
| 2,530,323 | Boyd | Nov. 14, 1950 |